(12) United States Patent
Jechoux et al.

(10) Patent No.: US 8,867,660 B2
(45) Date of Patent: Oct. 21, 2014

(54) METHOD AND SYSTEM TO MEASURE AND COMPENSATE UNDUE DCO FREQUENCY PEAKS AT GFSK RAMP DOWN

(75) Inventors: Bruno Jechoux, Antibes (FR); Giuseppe Li Puma, Bochum (DE)

(73) Assignee: Intel Mobile Communications GmbH, Neubiberg (DE)

( * ) Notice: Subject to any disclaimer, the term of this patent is extended or adjusted under 35 U.S.C. 154(b) by 211 days.

(21) Appl. No.: 13/326,679

(22) Filed: Dec. 15, 2011

(65) Prior Publication Data

US 2013/0154703 A1  Jun. 20, 2013

(51) Int. Cl.
*H04L 25/49* (2006.01)

(52) U.S. Cl.
USPC .......................................... 375/296

(58) Field of Classification Search
CPC ............ H04L 27/3411; H04L 27/2618; H04L 27/2624; H04L 27/2623; H04B 2201/70706; H04B 1/62; H04B 10/564; H04B 1/0475; H04B 2001/0433
USPC .............. 375/295–297, 285; 455/63.1, 67.13, 455/114.2, 114.3
See application file for complete search history.

(56) References Cited

U.S. PATENT DOCUMENTS

| | | | |
|---|---|---|---|
| 6,101,224 A | | 8/2000 | Lindoff et al. |
| 6,566,944 B1 * | | 5/2003 | Pehlke et al. ................... 330/10 |
| 7,020,070 B2 | | 3/2006 | Lindoff |
| 7,545,880 B1 | | 6/2009 | Coons et al. |
| 7,991,071 B2 | | 8/2011 | Hietala |
| 8,009,756 B2 * | | 8/2011 | Ishikawa et al. .............. 375/285 |
| 8,009,762 B1 | | 8/2011 | Al-Qaq et al. |

(Continued)

FOREIGN PATENT DOCUMENTS

DE    10320177 B3    6/2004

OTHER PUBLICATIONS

Notice of Allowance dated Sep. 16, 2013 for U.S. Appl. No. 13/326,712.

(Continued)

*Primary Examiner* — Khanh C Tran
(74) *Attorney, Agent, or Firm* — Eschweiler & Associates, LLC

(57) ABSTRACT

One embodiment of the invention relates to a communication system having an amplitude modulation path, a frequency deviation component, a characterization component, a peak cancellation component and a compensation unit. The amplitude modulation path is configured to provide an amplitude modulation signal. The frequency deviation component is configured to generate a frequency deviation signal. The characterization component is configured to generate characterization coefficients according to the amplitude modulation signal and the frequency deviation signal. The peak cancellation component is configured to identify peaks according to the amplitude modulation signal and generate a peak cancellation signal to compensate for peak distortion by the identified peaks. The compensation unit utilizes the characterization coefficients, the amplitude modulation signal and the peak cancellation signal to generate a correction signal that compensates for peak distortions and amplitude modulation to frequency modulation effects.

18 Claims, 9 Drawing Sheets

(56) References Cited

U.S. PATENT DOCUMENTS

| | | | |
|---|---|---|---|
| 2002/0196864 A1 | 12/2002 | Booth et al. | |
| 2005/0129140 A1* | 6/2005 | Robinson | 375/297 |
| 2007/0189417 A1 | 8/2007 | Waheed et al. | |
| 2009/0074106 A1 | 3/2009 | See et al. | |
| 2009/0207940 A1* | 8/2009 | Staszewski et al. | 375/297 |
| 2009/0213972 A1 | 8/2009 | Maunuksela et al. | |
| 2009/0252255 A1 | 10/2009 | Lee et al. | |
| 2009/0275358 A1 | 11/2009 | Feltgen et al. | |
| 2009/0275359 A1 | 11/2009 | Puma et al. | |
| 2010/0246714 A1* | 9/2010 | Yang et al. | 375/296 |
| 2010/0283665 A1 | 11/2010 | Bashir et al. | |

OTHER PUBLICATIONS

U.S. Appl. No. 13/326,712, filed Dec. 15, 2011.
U.S. Appl. No. 13/326,749, filed Dec. 15, 2011.
Notice of Allowance Dated Apr. 11, 2014 U.S. Appl. No. 13/326,749.
I. Bashir, et al. "An EDGE Transmitter with Mitigation of Oscillator Pulling" Radio Frequency Integrated Circuits Symposium (RFIC), 2010 IEEE Date May 23-25, 2010.
Office Action Dated Jul. 30, 2014 German Patent Application No. 102012222977.9.
Notice of Allowance dated Sep. 8, 2014 in connection with U.S. Appl. No. 14/105,849.

\* cited by examiner

METHOD AND SYSTEM TO MEASURE AND COMPENSATE UNDUE DCO FREQUENCY PEAKS AT GFSK RAMP DOWN

BACKGROUND

Power efficiency for transceiver architectures has become an important issue for portable handheld devices. Next generation wireless communication systems, Bluetooth, WLAN, GSM-EDGE, and the like, employ non-constant envelope modulation schemes in order to achieve high data-rates. Traditional designs of RF-modulator concepts employ vector modulator architectures which operate essentially as a single-sideband up-converter (SSB) using two digital-to-analog converters (DAC), two mixers and a linear power amplifier (PA). However, these architectures are power inefficient because they require a complete linear signal path. Further, the vector modulator concept requires a separation of the transceiver and the power amplifier on the mobile printed circuit board (PCB) in order to avoid parasitic coupling of the output signal into the VCO. Therefore the vector modulator transmitter approach has been replaced in some architectures by the polar modulator concept.

The polar modulator concept separates the modulation signal into an amplitude modulation (AM) signal and a phase modulation (PM) signal. The symbols or points used in polar modulation correspond or translate from Cartesian coordinates utilized in vector modulation concepts. The polar modulation concept provides power efficiency advantages, among others. However, the AM path can introduce distortions into the PM path, resulting in data loss, reduced bandwidth, and the like.

DETAILED DESCRIPTION

Figure 1:
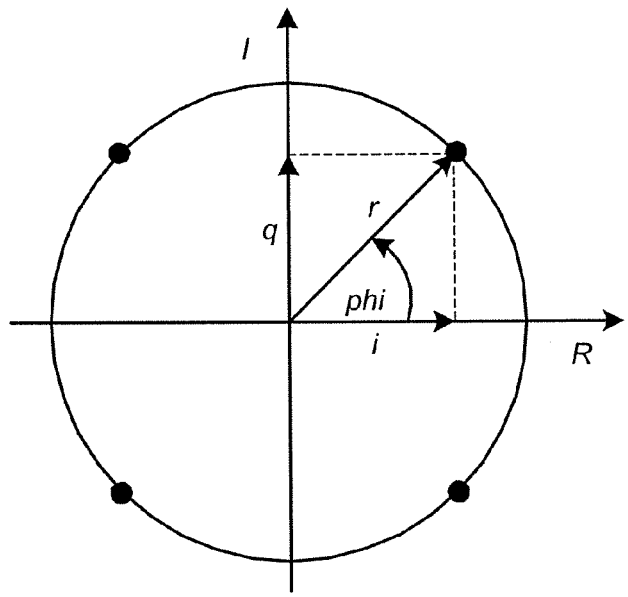
FIG. 1 shows a constellation diagram of a QPSK-signal.

The present invention includes methods and systems to measure and compensate for frequency peaks during transient phases of communication sequences. The frequency peaks can be due to a digital controlled oscillator (DCO) at transient phases, such as during ramp up and/or ramp down. Thus, the systems and methods employ peak cancellation in order to mitigate distortions while also correcting for amplitude modulation to frequency modulation effects.

It is appreciated that phase distortions caused by amplitude modulation (AM) to frequency modulation (FM) effects can be mitigated by utilizing a compensation component. The compensation component estimates the AM to FM distortion effects and generates a compensation or correction signal that can be utilized to pre-distort a phase modulation signal. However, peak distortions can be introduced during transient phases, such as ramp up or ramp down that are not corrected or compensated by AM to FM compensations or DPLL compensations alone. The present invention includes peak cancellation components and/or methods to mitigate the peak distortions.

One embodiment of the invention relates to a communication system having an amplitude modulation path, a frequency deviation component, a characterization component, a peak cancellation component and a compensation unit. The amplitude modulation path is configured to provide an amplitude modulation signal. The frequency deviation component is configured to generate a frequency deviation signal. The characterization component is configured to generate characterization coefficients according to the amplitude modulation signal and the frequency deviation signal. The peak cancellation component is configured to identify peaks according to the amplitude modulation signal and generate a peak cancellation signal to compensate for peak distortion by the identified peaks. The compensation unit utilizes the characterization coefficients, the amplitude modulation signal and the peak cancellation signal to generate a correction signal that compensates for peak distortions and amplitude modulation to frequency modulation effects.

The present invention will now be described with reference to the attached drawing figures, wherein like reference numerals are used to refer to like elements throughout, and wherein the illustrated structures and devices are not necessarily drawn to scale.

FIG. 1 shows a constellation diagram of a QPSK-signal. Phase shift keying (PSK) is a digital modulation scheme that conveys data by changing, or modulating, the phase of a reference signal, which is sometimes referred to as a carrier signal. Quadrature phase shift keying (QPSK) is an example of phase shift keying (PSK), which uses four phases.

A convenient way to represent PSK and QPSK is by utilizing a constellation diagram, such as that shown in FIG. 1. The constellation diagram shows the symbols or points in the Argand plane where the real and imaginary axes are termed the in phase and quadrature axes respectively, due to their ninety degrees phase separation.

The symbols are distributed on a circle with a distance of 90 degrees. The geometric location of symbols can be expressed in Cartesian coordinates i(t)+j·q(t) or polar coordinates $r(t)^{jphase(t)}$. Both expressions are equivalent and can be transformed into each other.

Figure 2:
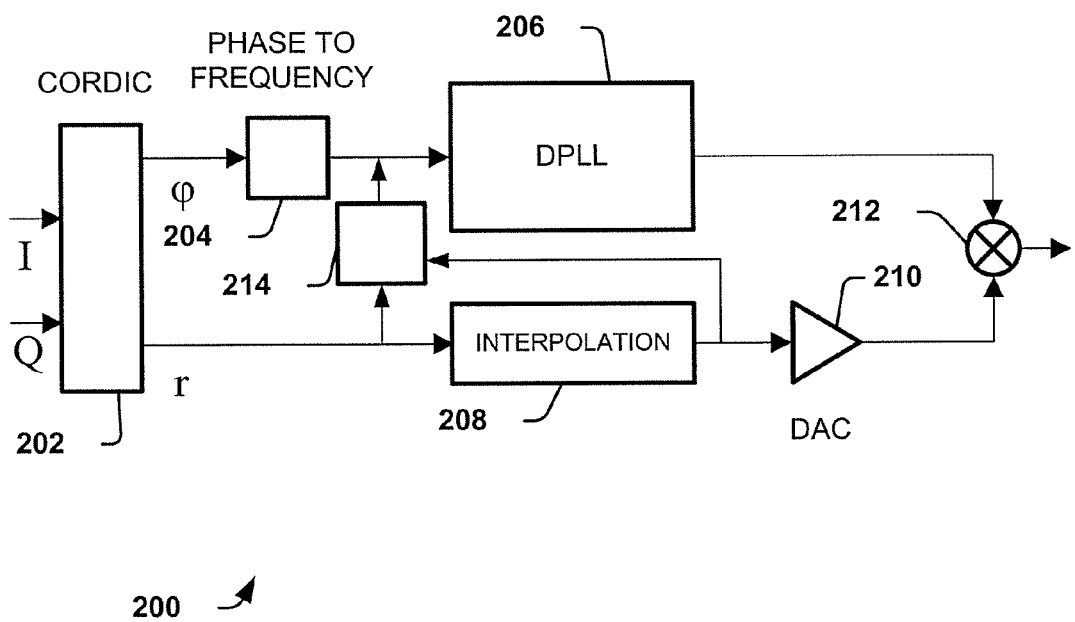
FIG. 2 is a simplified diagram illustrating a communication system employing polar modulation in accordance with an embodiment of the invention.

FIG. 2 is a simplified diagram illustrating a communication system 200 employing polar modulation in accordance with an embodiment of the invention. The system 200 includes a conversion component 202, a phase to frequency converter 204, a digital phase locked loop (DPLL) 206, an interpolation component 208, a digital to analog converter (DAC) 210, a mixer or combiner 212, and a compensation unit 214.

A processor (not shown) is configured to generate orthogonal in-phase (I) and quadrature-phase (Q) symbols or symbol components from a digital signal. The symbol components are also referred to as Cartesian symbol components. The Cartesian symbol components, I and Q, are received by the conversion component 202. The conversion component 202 translates the Cartesian symbol component into an amplitude modulation (AM) symbol components (r) and phase modulation (PM) symbol component (φ). The conversion component can comprise a COordinate Rotation DIgital Computer (CORDIC), in one example.

The phase component is provided to the phase to frequency converter 204 followed by the DPLL 206, that perform phase-frequency modulation. The phase to frequency converter 204 converts the phase component signal to a selected frequency. The converted signal is then provided to the DPLL 206. A phase modulated carrier signal, which varies at a first frequency, is then generated by the DPLL 206. The phase modulated carrier signal is provided to the mixer 212.

The amplitude components are received by the interpolation component 208. The interpolation component 208 shifts the amplitude modulation signal, which is a digital signal, to a selected sampling rate. An output of the interpolation component 208 is provided to the digital to analog converter (DAC) 210, which converts the digital signal into an analog signal. An output of the DAC 210 provides the analog signal as an amplitude modulated carrier signal. The amplitude modulated carrier signal is provided to the mixer 212.

The mixer 212 combines the phase modulated carrier signal with the amplitude modulated carrier signal. The signals are combined by modulating the amplitude of the AM carrier signal onto the PM carrier signal, resulting in an output signal. The combined signal can then be transmitted and/or amplified. The mixer 212 can utilize one of many suitable mechanisms to combine the carrier signals. In one example, the mixer 212 is a linear mixer.

The DPLL 206 includes a digital controlled oscillator (DCO). Employing polar modulation, instead of vector modulation, mitigates against parasitic coupling of a power amplifier output signal to the DCO, thereby mitigating the need for shielding chambers between a power amplifier and transceiver on a printed circuit board (PCB).

Various distortions can be introduced into the phase modulation path including, but not limited to amplitude modulation to frequency modulation effects, parasitic frequency modulation, peak distortions and the like. Shielding may still be needed to mitigate, for example, parasitic frequency modulation from the power amplifier (not shown) to the DCO. However, the inventors of the present invention recognize that one way to reduce the need for shielding and mitigate the distortions is to compensate or correct signals on the phase modulation path.

To mitigate unwanted errors and distortions, including the parasitic frequency modulation, the compensation component 214 provides a correction signal to the phase modulation path. The correction signal is used to pre-distort the phase modulation signal and mitigate the unwanted errors and distortions. In one example, the correction signal is mixed with the phase modulation signal in order to pre-distort the signal.

The compensation component 214 generates the correction signal from one or more inputs. The inputs include one or more of, samples of the amplitude modulation signal, frequency deviation samples, transmission power values, amplitude peak values, ramp transition signals, transient phases, and the like.

Figure 3:
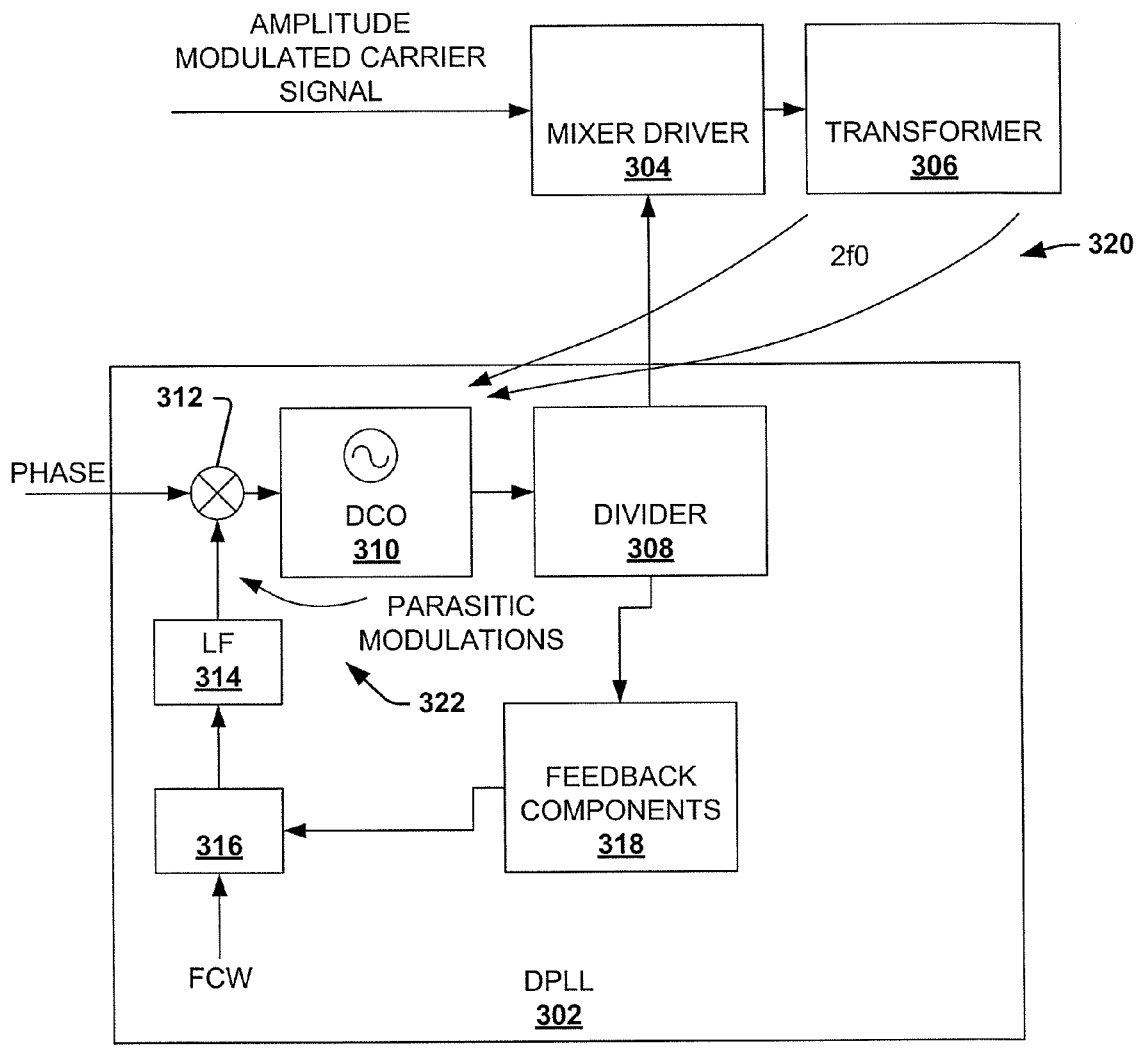
FIG. 3 is a diagram illustrating parasitic coupling of a second harmonic into a DCO for a DPLL of a communication system in accordance with an embodiment of the invention.

FIG. 3 is a diagram illustrating examples of distortions that can be introduced into a communication system. In one example, parasitic coupling of a second harmonic into a DCO for a DPLL of a communication system 300 induces distortion. The system 300 includes a DPLL 302, a mixer and driver component 304 and a transformer or coupler 306. The diagram is somewhat simplified in order to more fully illustrate the parasitic coupling.

The mixer and driver component 304 receives an amplitude modulated carrier signal from components not shown and a phase modulated carrier signal from DPLL 302. The transformer or coupler 306 couples the output signal for an antenna (not shown).

The DPLL 302 includes a DCO 310, a divider circuit 308, a mixer 312, a low pass filter 314, component 316, and feedback components 318. The mixer 312 receives a phase signal and combines it with an output signal from the low pass filter 314. The output signal of the mixer 312 is provided as an input signal to the DCO 310. The component 316 receives a frequency control word (FCW) that selects a frequency for use by the DCO 310. The component 316 can perform other functions as well. An output of the component 316 is provided as an input to the low pass filter 314. The feedback components 318 also provide a feedback signal as an input to the component 316.

The DCO 310 receives the mixer output and provides a phase modulated signal as an output. The output of the DCO is received by the divider 308, which provides the phase modulated carrier signal to the mixer and driver component 304. The divider 308 reduces the frequency of the phase modulated signal by dividing the frequency of the signal by a selected value, such as 2. Another output of the divider 308 provides a second reduced frequency signal to the feedback components 318.

In some communications systems, such as Bluetooth Enhanced Data Rate (BT-EDR) systems, variable envelope modulation is used. Then, the output signal from the mixer and driver component 304 being coupled 320 back to the DCO 310. This coupling 320 generates an unwanted AM to FM conversion, which leads to degradation of the modulation spectrum and increases a differential error vector magnitude. The unwanted conversion is also referred to as a parasitic frequency modulation or second order distortion (H2). Additionally, there are parasitic modulations 322 resulting from the DCO 310 itself. The parasitic frequency modulation, peak distortions, and other distortions can be mitigated as shown below.

Figure 4:
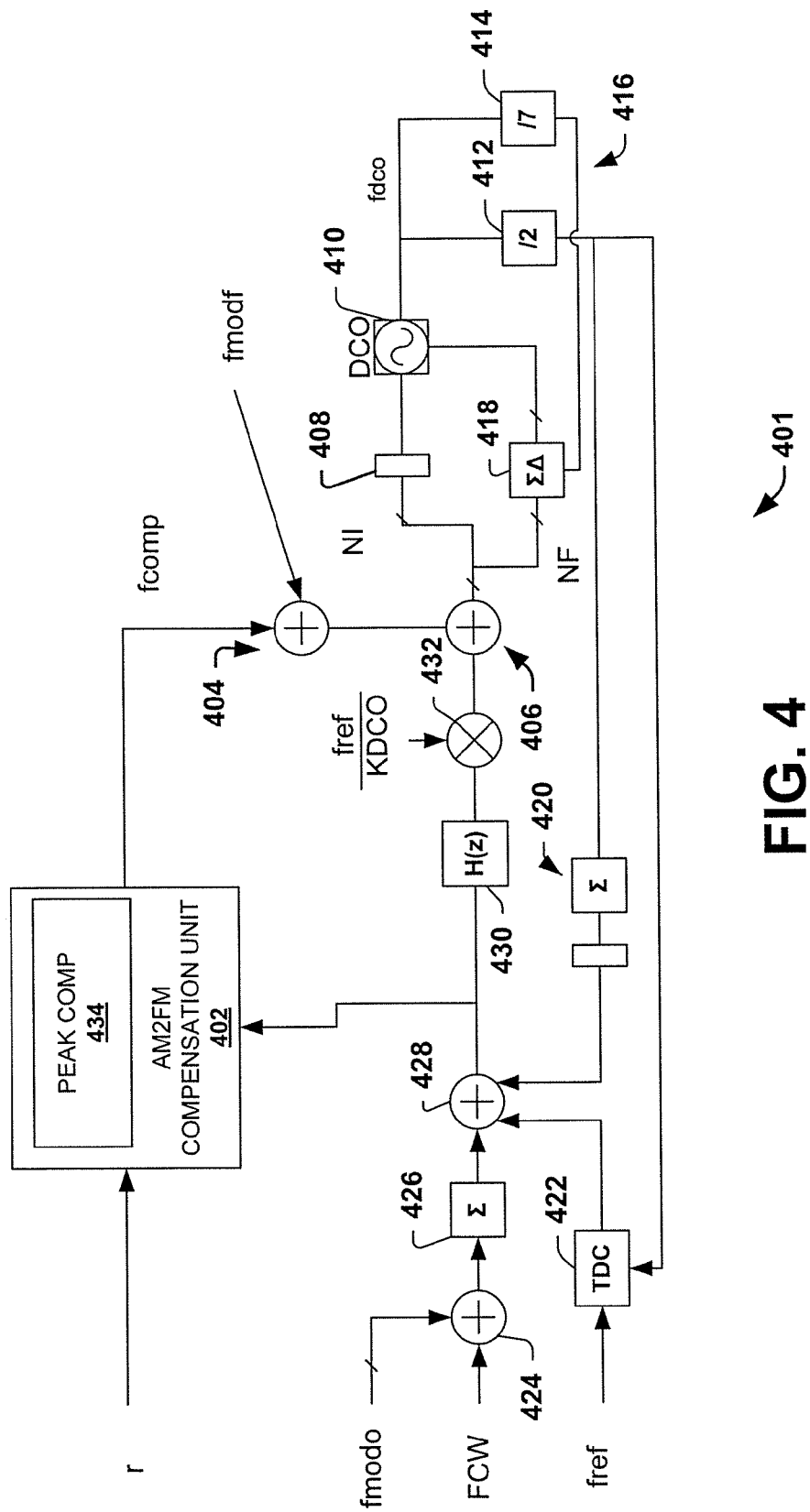
FIG. 4 is a diagram illustrating a DPLL system that includes an amplitude compensation unit having a peak cancel component in accordance with an embodiment of the invention.

FIG. 4 is a diagram illustrating a DPLL system 400 that includes an amplitude compensation unit 402 and a peak cancellation component 434. The system 400 compensates for unwanted amplitude to frequency modulation effects in polar transmitter architectures. The system performs frequency modulation as a two (2) point modulation. The DCO 410 is directly modulated in a feedforward manner by a modulation signal fmod_f. Additionally, a correction input fmod_c is added to a static frequency channel word FCW to correct or mitigate expected phase modulation of the DCO 410.

The system 400 includes the compensation unit 402, a first summation component 404, a second summation component 406, a first component 408, a DCO 410, a first divider 412, a second divider 414, a sigma delta component 418, a sigma component 420, a TDC component 422, a third summation component 424, a second sigma component 426, a fourth summation component 428, a loop filter 430, a compensation filter 434 and a mixer 432.

The compensation unit 402 performs amplitude to frequency compensation according to one or more inputs, including an amplitude modulation signal "r" and a frequency deviation signal, also referred to as an error signal. The compensation unit provides a correction signal, also referred to as a compensated output, "fcomp", or a compensation signal to the first summation component 404. The compensation unit 402 includes a peak cancellation component 434 that identifies provides additional correction for the identified peaks in order to mitigate peak distortions.

The first summation component 404 receives the correction signal fcomp and the (uncorrected) phase modulation signal fmod_f and provides an output signal there from. The output signal can also be referred to as the corrected phase modulation signal. The second summation component 406 receives the output signal from the first summation component and an output from the mixer 432. The second summation component 406 provides an output that is the sum of its inputs to components 408 and 418. The output signal of the second summation component can also be referred to as the corrected phase modulation signal.

The output of the second summation component 406 is received by component or stage 408, which then passes the signal to the DCO 410. The output of the second summation component 406 is also received by the sigma delta modulator or component 418. The DCO 410 generates a DCO output signal (fdco) based on its input from stage 408 and an output from the delta sigma component 418. The DCO output signal is then received by divider circuits 416, which include a first divider 412 and a second divider 414. The first divider 412 divides the DCO output signal frequency by two (2) and the second divider 414 divides the DCO output signal frequency by seven (7). The output of the second divider 414 is provided to the delta sigma component 481.

The first sigma component 420 or integrator and stage receives an output of the first divider 412 and provides its output to the fourth summation component 428 as a first sigma signal. The TDC 422 component also receives the output of the first divider and provides an output to the fourth summation component 428. The TDC 422 operates on a reference frequency (fref) and an output of divider 412. The TDC is configured to measure a time delay between the phase of the reference frequency (fref) and the phase of the output of divider 412. The output from the TDC is a digital word representing the phase/time error between the reference frequency and the output of the divider 412.

The correction input fmod_c is added to the frequency control word FCW by the third summation component 424. The sum is provided to a second sigma component 426, which provides a second sigma signal to the fourth summation component 428. The fourth summation component 428 adds the TDC output signal to the second sigma signal and subtracts the first sigma signal to provide a phase detector signal as an output. The phase detector signal is also utilized as the error signal and, in one example, takes the form of a digital word.

The frequency deviation signal is also provided to the loop filter 430, which provides its output to the mixer 432. The loop filter 430 filters and processes the frequency deviation signal and provides a frequency control word, which represents an error or variation between an instantaneous operating frequency and a newly desired operating frequency of the DCO 410.

Polar modulation communication systems include an amplitude modulation path and a phase modulation path. The amplitude modulation path generates the amplitude modulation signal and amplitude carrier signal. The phase modulation path generates the phase modulation signal and phase carrier signal. If amplitude and phase modulation paths of a communication system utilizing DPLL 400 were perfectly matched, the transmitted signal is removed from the PLL loop dynamics and the frequency deviation signal, also referred to as the phase detector signal, remains zero (0). However, parasitic coupling of the second harmonic of the carrier signal causes a parasitic frequency modulation of the DCO 410. The DPLL attempts to correct the perceived phase modulation by utilizing the correction input (fmod_c). However, low pass characteristics of the DPLL 400 cause the DPLL 400 to react slowly to perturbations and thus the DPLL 400 achieves only a limited suppression of the parasitic modulation. Thus, amplitude modulation to frequency modulation effects can still be present in transient phases, such as ramp up and ramp down, also referred to as a peak. These peaks can lead to peak distortions that can distort other portions of communication sequences, including data portions, and can prevent synchronization, frequency drift, and the like. The peak cancellation component 434 identifies the peak and adjusts the correction signal to account for the identified peak, as shown above.

One or more inputs, including the frequency deviation signal and the amplitude modulation signal r[k], are used by the compensation unit 402 to generate the correction signal. In another example, the one or more inputs include a filtered frequency deviation signal obtained by using a digital filter to filter the frequency deviation signal and suppress or remove DPLL induced distortions.

The compensation unit 402 uses one or more suitable approaches to generate the correction signal. In one example, a look up table (not shown) approach is used. The lookup table has 2 stored values per entry, the squared and cubic magnitudes of the amplitude modulation signal, corresponding to an instantaneous address in the lookup table. The error signal is utilized to update addresses in the lookup table. The update of the lookup table is performed at a rate of a phase detector clock rate, which is rate at which the frequency deviation signal is generated. To update the table, first an instantaneous frequency error or variation is determined as a difference of a current frequency deviation value minus a previous frequency deviation value and multiplied by a step size parameter. The values can be provided in the form of the filtered frequency deviation signal. The instantaneous frequency error is used to update the table entry value at the address of r[k-k0], where k0 is the delay between the compensation or correction signal output value fcomp[k-k0] and the current frequency deviation value p[k]. The correction or compensation signal fcomp[k] should also be aligned in time respect to a transmit carrier signal s(t). As a result, the time delay of the compensating signal path should be adjusted to the delay of the envelope signal path.

A suitable approach is utilized to generate the correction signal based on the inputs. In one example, the compensation unit 402 generates a correction signal according to the following formula:

$$f_c(r) = a_2 r^2 + a_3 r^3$$

where r is a current sample of the envelope or amplitude modulation signal, $a_2$ is a first coefficient and $a_3$ is a second coefficient. The first and second coefficient can be derived by performing a least squares estimation during a ramp portion of a communication sequence, as shown infra.

Figure 5A:
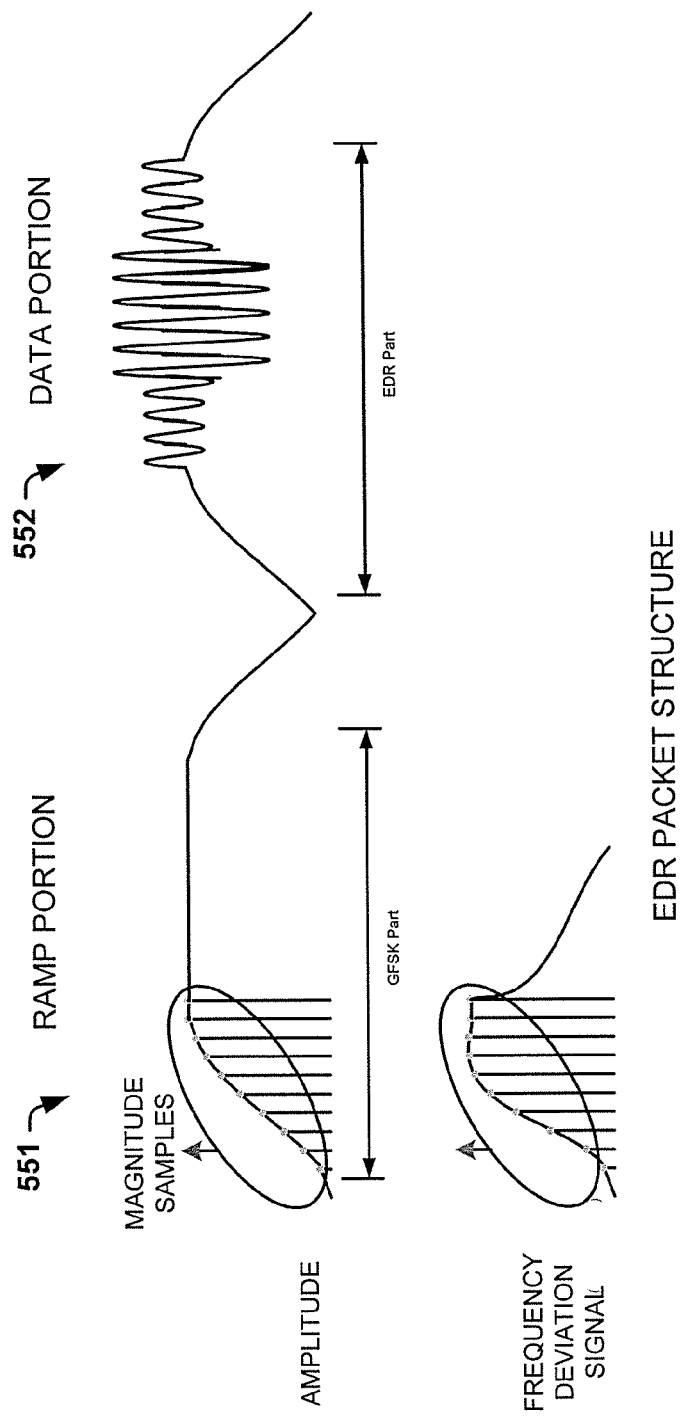
FIG. 5A is a graph showing an example of frame that can be utilized to mitigate unwanted errors or distortions.

FIG. 5A is a graph showing an example frame that can be utilized to mitigate unwanted errors or distortions. The example frame shown is an enhanced data rate (EDR) frame according to the Bluetooth standard. The frame includes a training or ramp portion 551 and a data portion 552. The ramp portion 551 is a GFSK ramp in this example. The data portion 552 is an EDR portion. Additionally, the graph shows the instantaneous frequency deviation values 553. It can be seen that the ramp portion includes a sweep of magnitude values. There is a guard time between the ramp portion 551 and the data portion 552. It is noted that a peak is present between and about the portions 551 and 552.

Figure 5B:
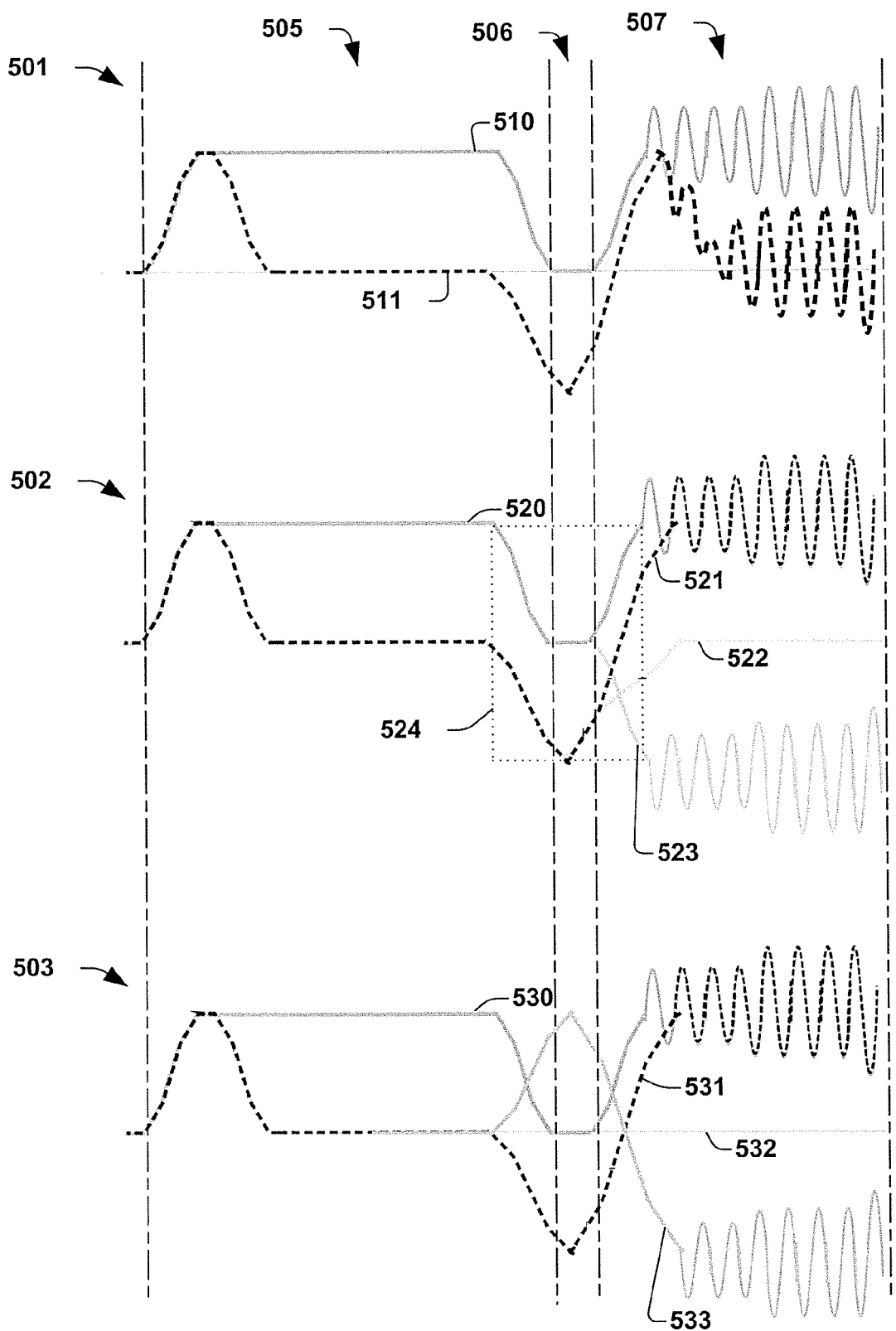
FIG. 5B is a graph illustrating various examples of distortions and corrections in accordance with an embodiment of the invention.

FIG. 5B is a series of graphs illustrating phase correction compensation and peak cancellation effects in accordance with an embodiment of the invention. The graph illustrates a frame similar to that shown in FIG. 5A, but with different signals and compensations. The graphs depict time on an x-axis and phase modulation signal values on a y-axis. The graph illustrates frequency distortion over a Bluetooth (BT) enhanced data rate (EDR) packet without compensation 501, with amplitude effects compensation only 502, and with peak cancellation and amplitude effects compensation 503.

The packet is depicted in three parts, a ramp or transient part 505, a guard time part 506, and a data part 507. The ramp part 505, in this example, corresponds to a GFSK preamble and header. The data part 507, in this example, is an enhanced data rate part and includes a DxPSK payload. The ramp part 505 includes a ramp up portion at a beginning and a ramp down portion at the end of the part. The guard time part 506 is an off or rest period between the ramp part 505 and the data part 507. The data part 507 includes an initial transition period, prior to actual data transfer.

The first section 501 is shown with two lines, line 510 and line 511. Line 510 depicts a phase modulation signal with uncompensated distortions resulting from amplitude modulation to frequency modulation effects. During the ramp part 505, the signal remains above zero until the guard part 506. Thereafter, the signal 501 develops to cycling about a non-zero value during the data part 507. Line 511 depicts a phase modulation signal suffering from amplitude modulation to frequency modulation effects but compensated by a DPLL control loop. During the ramp part 505, the signal 511 properly moves towards a zero value because of the DPLL control loop compensation. However, during the initial transition period of the data part 507, also referred to as an EDR ramp up, the compensation from the DPLL control loop is not able to correct from the peak of the ramp down from part 505. Thus, the signal of 511 takes some time to cycle about a zero value during the data part 507. This distortion, referred to as peak distortion, can result in a number of difficulties including receiver synchronization failure, frequency drift, DEVM violations, and adjacent channel power (ACP) specification violations.

The second section 502 of the graph depicts frequency responses with amplitude effects compensation. Here, line 520 depicts a phase modulation signal with uncompensated distortions resulting from amplitude modulation to frequency modulation effects and operates as the signal shown by line 510. Line 521 depicts a phase modulation signal compensated by a DPLL control loop and AM to FM compensation or correction. Line 523 illustrates an amplitude compensation or correction signal. Line 522 depicts residual distortion.

The correction signal of line 523 significantly reduces distortion. However, it can be seen that the peak region results in residual distortion or peak distortion that can lead to synchronization errors and the like, as described above.

The third section 503 of the graph depicts frequency responses with amplitude effects compensation and peak cancellation. Here, line 530 depicts a phase modulation signal with uncompensated distortions resulting from AM to FM effects and operates in a similar fashion as line 510. Line 531 depicts a phase modulation signal compensated by a DPLL control loop and AM to FM compensation or correction. Line 531 operates in a similar fashion to line 521, shown above. Line 533 illustrates an amplitude compensation or correction signal that includes peak cancellation. Line 532 depicts residual distortion.

It can be seen that the residual distortion 532 is at about zero throughout the packet. The peak distortion or residual distortion shown in section 502 is not present in section 503. Furthermore the correction signal of line 533 includes a peak cancellation portion that accounts for the peak, which is not present in the correction signal of line 523.

Figure 6:
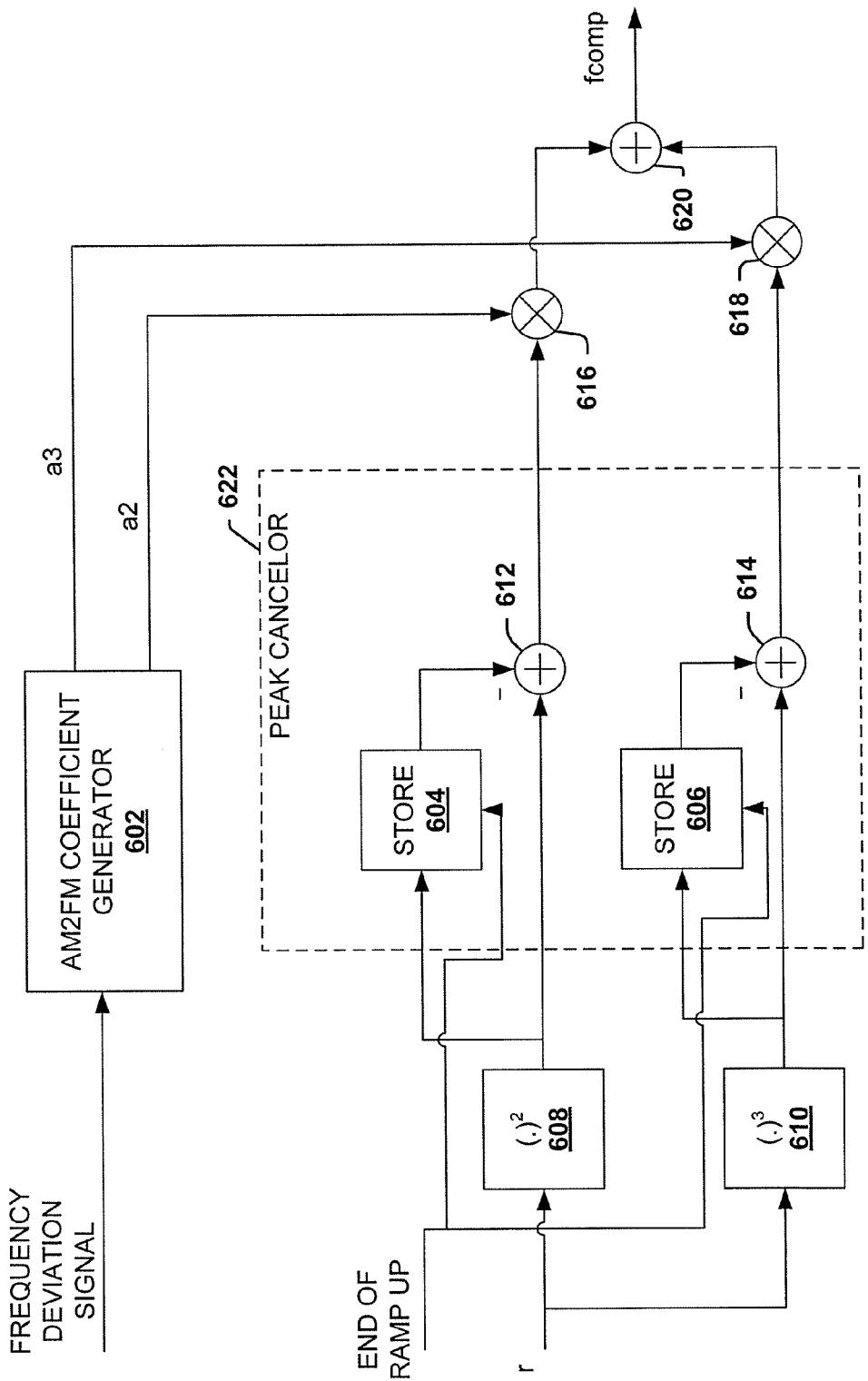
FIG. 6 is a block diagram illustrating a compensation unit that includes a peak cancel component in accordance with an embodiment of the invention.

FIG. 6 is a block diagram illustrating a compensation unit 600 that includes a peak cancel component 622 in accordance with an embodiment of the invention. The compensation unit 600 mitigates distortions in communication systems by estimating distortions and identifying peaks to pre-distort signals along a phase modulation path.

The compensation unit 600 includes a coefficient generator 602, first function component 608, a second function component 610, a peak cancel component 622, a first mixer 616, a second mixer 618, and an adder or summation component 620.

The coefficient generator 602 generates coefficients a2 (a second order coefficient) and a3 (a third order coefficient) from one or more inputs, including a frequency deviation signal. The coefficients can be generated or estimated during a ramp portion of a communication sequence.

An amplitude modulation signal "r" is received by the first function component 608 and the second function component 610. The first function component 608 generates a first output from the amplitude modulation signal and the second component 610 generates a second output from the amplitude modulation signal. The first output is a square of a maximum amplitude value, as described in more detail below. The second output is a cubic of the maximum amplitude value.

The peak cancel component 622 receives the first output and the second output and an end of ramp signal as inputs and generates a second order factor at a first output and a third order factor at a second output. The peak cancel component 622 includes a first store 604 and a second store 606. The store components 604 and 606 operate on a clock to store a value. The first store 604 stores the first output and operates on the end of ramp signal to provide a first stored output. A first peak summation component 612 subtracts the first stored output from the first output to yield the second order factor. The second store 606 stores the second output and also operates on the end of ramp signal to provide a second stored output. A second peak summation component 614 subtracts the second stored output from the second output to yield the third order factor. The first stored output and the second stored output can also be referred to as peak compensation signals.

The first mixer 616 multiples the a2 coefficient with the second order factor to provide a first mixer output. The second mixer 618 multiplies the a3 coefficient with the third order factor to provide a second mixer output. The summation component 620 adds the first mixer output to the second mixer output to generate an output signal fcomp that can be utilized to pre-distort or compensate a phase modulation signal along a phase modulation path. The output signal fcomp is also referred to as a correction signal.

The following discussion provides additional details on a mechanism to generate a compensation or correction signal that includes peak cancelling and can be utilized to pre-distort a phase modulation signal to mitigate distortions, including peak distortions.

Considering that the frequency distortion generated by the AM-to-FM effect can be modeled as a $2^{nd}$ order and $3^{rd}$ order function of the signal amplitude r, the AM to FM frequency offset during the GFSK part is:

$$f_{AM2FM}(r_{MAX}) = -\alpha_2 r_{MAX}^2 - \alpha_3 r_{MAX}^3$$

where $r_{MAX}$ is a maximum amplitude during a ramping portion of a signal, $\alpha_2$ is a second order coefficient (as shown above as a2), and $\alpha_3$ is a third order coefficient (as shown above as a3).

At the end of the GFSK ramp-up the DPLL output frequency is hence:

$$f_{out}(t_1) = f_0 + f_{AM2FM}(r_{MAX})$$

where $t_1$ is the instant just after the end of GFSK ramp-up. Then the distortion is mitigated by the DPLL control loop and after the DPLL transient, the remaining frequency is $$f_{out}(t_2) = f_0 = f_0 + f_{AM2FM}(r_{MAX}) + f_{DPLL}(r_{MAX})$$

where $f_{DPLL}(r_{MAX}) = -f_{AM2FM}(r_{MAX})$, and $t_2$ is equal to $t_1$ plus a DPLL transient.

At the end of the GFSK ramp down the AM to FM distortion instantaneously disappear, because the signal amplitude goes down to zero, while the DPLL compensation remains present and the output frequency is $$f_{out}(t_3) = f_0 + f_{AM2FM}(0) + f_{DPLL}(r_{MAX})$$
$$= f_0 + f_{DPLL}(r_{MAX})$$
$$= f_0 - f_{AM2FM}(r_{MAX})$$

until the end of DPLL transient where the DPLL compensation has come back to zero. The $t_3$ denotes the instant just after the end of GFSK ramp-down.

This constitutes the GFSK ramp down frequency peak that results in peak distortion and needs to be compensated to avoid or mitigate the peak distortion. Its magnitude is $$-f_{AM2FM}(r_{MAX}) = \alpha_2 r_{MAX}^2 + \alpha_3 r_{MAX}^3$$

The frequency peak compensation algorithm is enabled during the GFSK part, i.e. after the DPLL transient following the GFSK ramp up. It generates a compensation signal $f_{comp}$ which exactly cancel the frequency peak, and is shown as:

$$f_{comp}(r) = \hat{\alpha}_2 r^2 + \hat{\alpha}_3 r^3 + f_{AM2FM}(r_{MAX})$$
$$= \hat{\alpha}_2 (r^2 - r_{MAX}^2) + \hat{\alpha}_3 (r^3 - r_{MAX}^3)$$

where $r_{MAX}^2$ and $r_{MAX}^3$ have the very desirable feature of being intermediate values directly available internally in the AM-to-FM compensation unit during the GFSK part while $\hat{\alpha}_2$ and $\hat{\alpha}_3$ are estimated from the DPLL phase error output by means of least squares estimation during GFSK ramp up.

One example of obtaining the coefficients via least squares estimation is shown here. Magnitude ramp samples, noted as $m_1$ to $m_N$ hereafter, and instantaneous frequency deviation samples, noted as $y_1$ to $y_N$ hereafter, are obtained as shown above. The ramp samples and frequency deviation samples are obtained during the ramp or training portion of a frame. In one example, 26 ramp and frequency deviation samples are obtained for a 1 microsecond ramp sampled at 26 MHz. In another example, 75 ramp and frequency deviation samples are obtained for a 3 micro second ramp. A large number of samples, such as greater than 26, mitigates phase noise effects. An order 2 and 3 polynomial least square fitting of the frequency deviation samples versus the magnitude ramp samples is performed. The fitting aims at determining an optimum or suitable value for $a_2$ and $a_3$, second and third order coefficients of the polynomial. It is noted this method can be extended to any polynomial fitting order and is not limited to a specific second and third order fitting, as shown herein.

The estimation is performed over N samples where Y is a vector representing the frequency deviation samples $y_1$ to $y_N$ and M is an array representing the ramp samples $m_1$ to $m_N$. A is a coefficient vector representing the $2^{nd}$ and $3^{rd}$ order coefficients, $a_2$ and $a_3$, shown above as $\hat{\alpha}_2$ and $\hat{\alpha}_3$.

$$Y = MA$$

$$\begin{bmatrix} y_1 \\ y_2 \\ \vdots \\ y_N \end{bmatrix} = \begin{bmatrix} m_1^2 & m_1^3 \\ m_2^2 & m_2^3 \\ \vdots & \vdots \\ m_N^2 & m_N^3 \end{bmatrix} \begin{bmatrix} a_2 \\ a_3 \end{bmatrix}$$

The least squares estimate of the coefficients vector A is equal to:

$$\hat{A} = (M^T M)^{-1} M^T Y = HY$$

Thus, the second order and third order coefficients are obtained.

Figure 7:
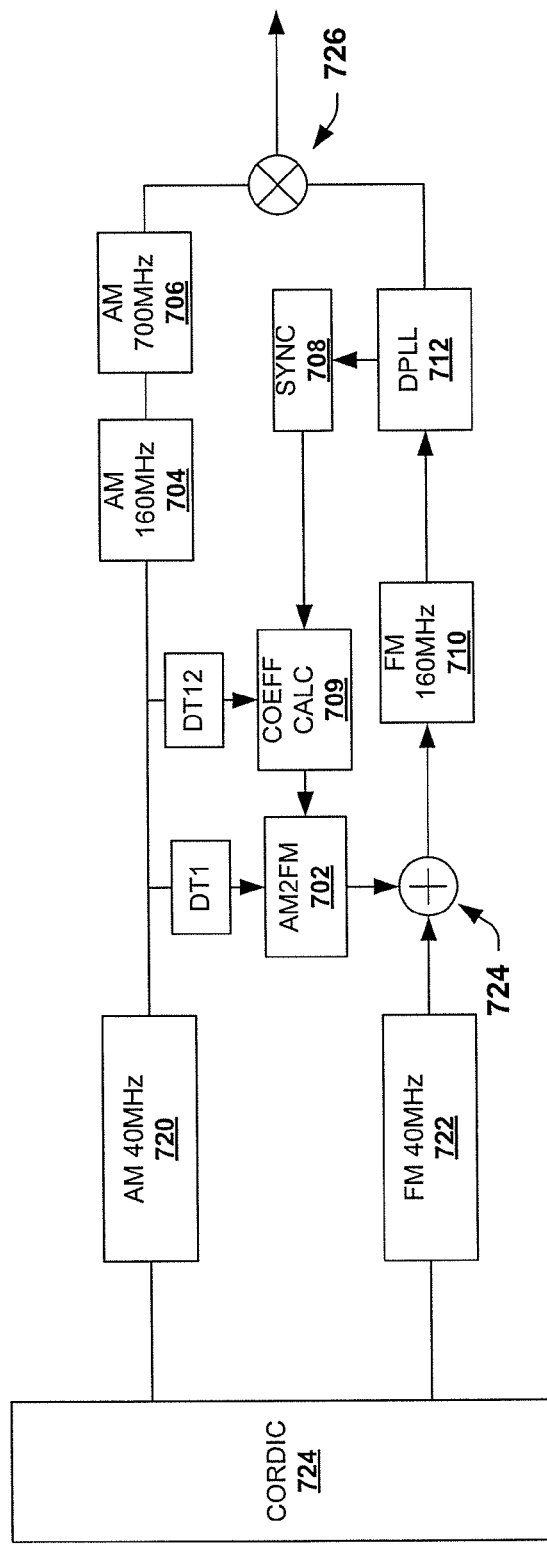
FIG. 7 is a block diagram illustrating a communication system in accordance with an embodiment of the invention.

FIG. 7 is a block diagram illustrating a communication system 700 in accordance with an embodiment of the invention. The system 700 includes a compensation unit having a peak cancellation component that provides a correction signal to a phase modulation path in order to compensate for unwanted distortions or errors, including unwanted frequency shift. The compensation component also mitigates distortions produced by frequency peaks due to the peak cancellation component.

The system 700 includes a conversion component 724 that receives symbol components, such as Cartesian symbol components and translates the received symbol components into phase and amplitude components. The phase component is provided to frequency modulation component 722 and the amplitude component is provided to amplitude modulation component 720.

The amplitude modulation component 720 generates or modulates an amplitude signal from the amplitude component at a selected frequency. The amplitude modulation component 720 operates at a suitable frequency, such as 40 MHz, to generate the amplitude signal. A second amplitude modulation component 704 modulates the amplitude signal to a higher frequency. In one example, the higher frequency is 160 MHz. A third amplitude modulation component 706 modulates the amplitude signal to a carrier frequency. In one example, the carrier frequency is 700 MHz. The amplitude signal is then provided to mixer 726.

The phase components are received by a phase to frequency converter 722, which converts the phase components to a selected frequency as a phase signal. In one example, the selected frequency is 40 MHz. The phase signal is added to a correction signal at summation component 724. As stated above, the correction signal at least partially compensates for distortions or errors, including unwanted frequency shifts. The phase signal is converted to a higher frequency at modulation component 310. In one example, the higher frequency is 160 MHz. The phase signal is provided to DPLL 712 whose output represents a phase modulated carrier signal. The phase modulated carrier signal is provided to the mixer 726, where it is combined with the amplitude modulated carrier signal and provided as an output signal. The output signal can be further amplified, transmitted, and the like.

The DPLL 712 also provides a frequency deviation signal, also referred to as a phase differential signal, to a sync component 708. An output of the sync component 708 is provided to the coefficient calculation component 709. Further, a delayed amplitude DT12 signal is also provided to the coefficient calculation component 709. The delayed amplitude DT12 signal corresponds to the output of component 720 delayed by DT12. The delay, DT12, is placed there to compensated for delays between the amplitude signal output by component 720 up to the coefficient calculation component 709.

A second signal made of the amplitude signal from component 720 is delayed by DT1 and is provided to the compensation component 702. The amplitude compensation component 702, also referred to as an AM to FM compensation component, generates the correction signal according to the amplitude signal delayed by DT1, the characterization coefficients, and, possibly, one or more additional inputs.

The compensation component 702 is configured to operate with two phases, an estimation phase and a pre-distortion phase. During the estimation phase, the compensation component 702 or the coefficient calculation component 709 utilizes a magnitude ramp portion of a frame and instantaneous frequency deviation values to estimate distortions of the phase modulation path, including amplitude modulation to frequency modulation effects and second order distortion effects. The magnitude ramp is present during certain types of frame configurations, such as GFSK modulation. The instantaneous frequency deviation values or samples are provided in the form of the frequency deviation signal or the filtered frequency deviation signal. The distortion effect results from frame transmission conditions including, but not limited to, frequency channel, max power, temperature, chip process, and the like. The compensation component 702 utilizes the estimated distortion to pre-distort the phase modulation signal by providing the correction signal to the summation component 724. It is also noted that the time delay of the frequency correction signal should be adjusted to a delay of the envelope signal path so that the frequency correction signal is aligned in time respect to the output signal provided at the mixer 726.

The peak cancellation component of the compensation unit 702 identifies the peaks by monitoring amplitude samples or values as shown in FIG. 5B and described above. Once the peaks are identified, the peak cancellation component generates a frequency peak compensation signal that is used as the correction signal for the identified peak. The peak compensation signal is generated by identifying max amplitude values during the ramp part of a communication sequence and using the identified max amplitude values and the coefficients to alter the correction signal and account for the peaks.

In one example, the estimated distortion is calculated for each frame. However, the inventors of the present invention recognize that a training or ramp portion of subsequent frames may be substantially similar to a current or previous frame. Thus, in another example, the estimated distortion is reused for a period of time or a selected number of frames to mitigate power consumptions and computation.

It is also noted that Fig. shows the compensation unit 702, the coefficient calculation component 709. However, it is appreciated that any or all of these can be combined into a single compensation unit.

Figure 8:
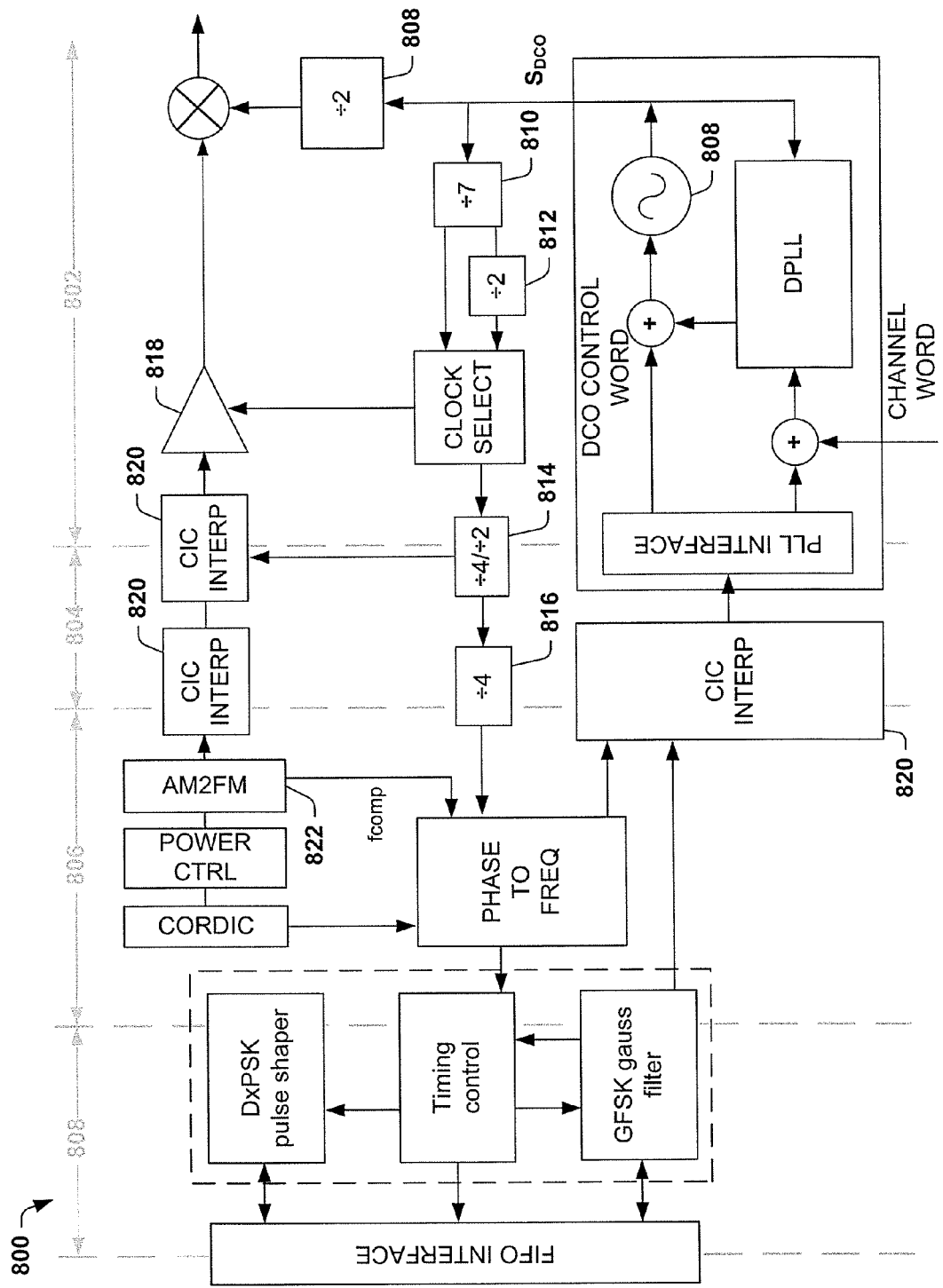
FIG. 8 is a diagram illustrating a Bluetooth polar transmitter as provided in accordance with an embodiment of the invention.

FIG. 8 is a diagram illustrating a Bluetooth polar transmitter 800 as provided in accordance with an embodiment of the invention. The transmitter 800 includes a compensation component 822 to mitigate unwanted errors and distortions from the amplitude modulation path and to also compensate for peak distortions. FIG. 8 illustrates a polar transmitter having a plurality of frequency dividers configured to generate three different "frequency regions", wherein the transmitter operations performed in each of the frequency regions are dependent upon a reduction of a DCO frequency equal to twice the Bluetooth operating frequency (e.g., 4804 to 4960 MHz). It will be appreciated that FIG. 8 illustrates a simplified example of a divider configuration that may be used to generate a number of frequency regions and is not intended as a limiting example.

In a first region 802, the frequency of the output signal $S_{DCO}$ from DCO 808 is divided by frequency dividers 810 to generate operating frequencies of 686 MHz-708 MHz or collectively by divider 810 and 812 to generate operating frequencies of 343 MHz-354 MHz. The frequencies in the first region 802 are used to generate a clock signal that drives sampling of DAC 818 to generate an analog amplitude modulated signal having a desired frequency.

In a second region 804, the frequency of the output signal $S_{DCO}$ from DCO 808 is further divided by divider 814 to generate an operating frequency of 171 MHz-177 MHz for certain digital operations. As shown in FIG. 8, a further integer division by 4 (or 2 depending on the selective use of dividers 810 and 812) generates an a signal for digital operations in both the amplitude and modulation path. These digital operations may comprise CIC interpolation of the AM signal and/or PM signal(s) by interpolator(s) 820.

In a third region 806, the frequency of the output signal $S_{DCO}$ from DCO 808 is further divided by divider 816 to generate an operating frequency of 42 MHz-44 MHz. As shown in FIG. 8, a further integer division by 4 generates a signal for other operations in the digital part of the polar transmitter such as the CORDIC and pulse shaping filter respectively.

A further divider (not shown) may be used to divide the 42 MHz-44 MHz signal down to 10-11 MHz clock signal for use in a fourth region 808. The 10-11 MHz clock signal may be used in digital operation of additional components such as the DxPSK pulse shaper and/or timing control, etc.

The compensation unit 822 operates in the third region to mitigate unwanted phase signal errors and distortions resulting including peak distortions. The compensation unit 822 derives an estimate of phase modulation distortions, including amplitude modulation to frequency modulation effects. The estimate is derived at least partly from ramp values and filtered or unfiltered frequency deviation values during a ramp portion of a communication sequence. The frequency deviation values are filtered to mitigate introducing variations from the DPLL.

The compensation unit 822 also includes a peak cancellation component that identifies peaks, ramp up and ramp down sequences, by monitoring amplitude samples or values as shown in FIG. 5B and described above. Once the peaks are identified, the peak cancellation component generates a frequency peak compensation signal that is used as the correction signal for the identified peak. The peak compensation signal or amount is generated by identifying max amplitude values during the ramp part of a communication sequence and using the identified max amplitude values and the coefficients or estimates to account for the peaks.

During data portion(s) of the communication sequence, the compensation component 822 utilizes the estimate and the peak compensation signal to pre-distort the phase modulation signal to mitigate for the unwanted errors and distortions.

Figure 9:
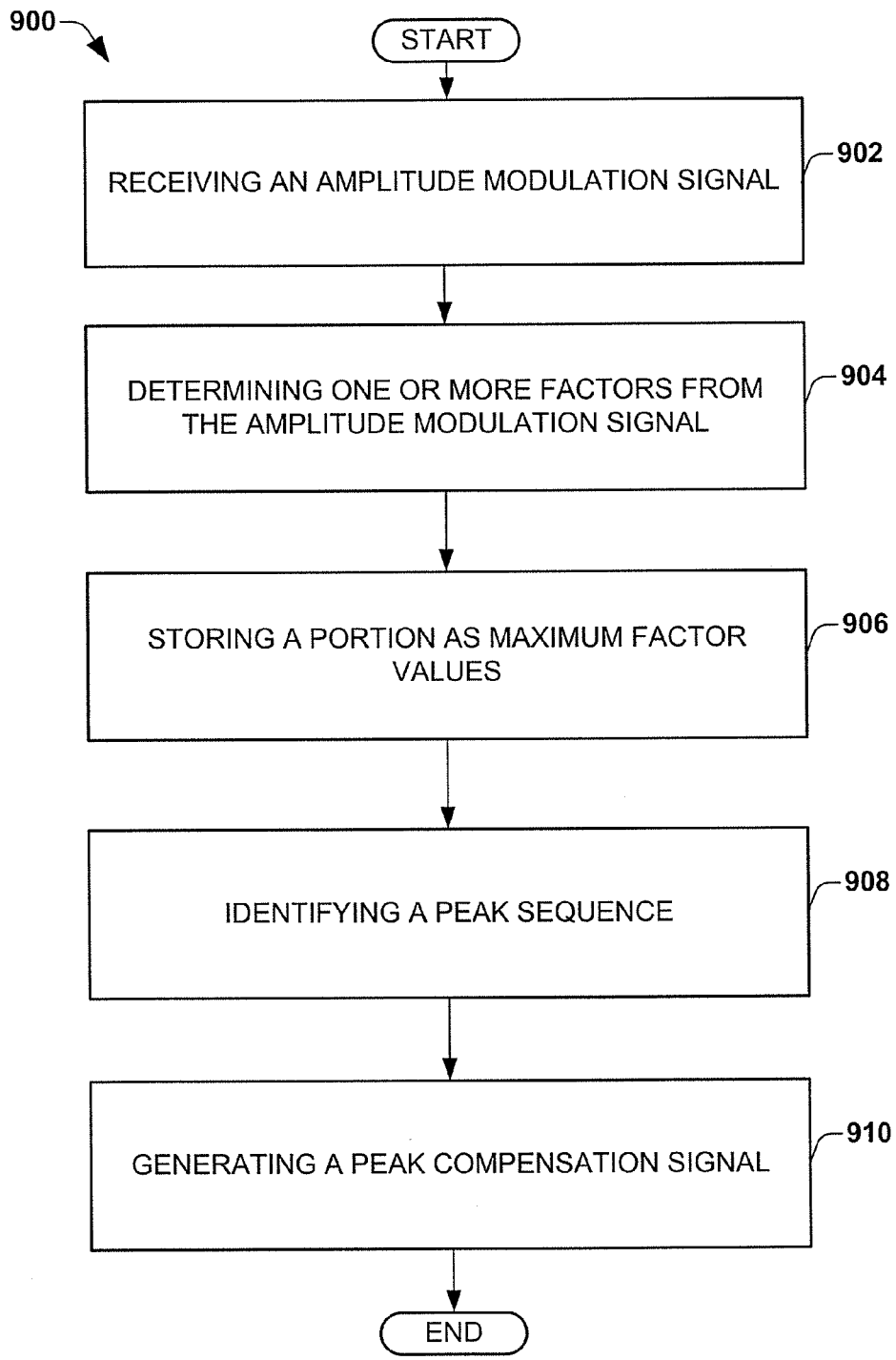
FIG. 9 is a flow diagram illustrating a method to mitigate phase and frequency distortions with peak cancelling resulting from an amplitude modulation signal in accordance with an embodiment of the invention.

FIG. 9 is a flow diagram illustrating a method 900 to mitigate phase modulation distortions, including those resulting from an amplitude modulation signal and peak distortions. The method 900 includes identifying peaks and generating a peak compensation signal during the peak sequences. As a result, errors and distortions resulting from peak sequences are mitigated.

The method begins at block 902, where an amplitude modulation signal is received. The signal can be sampled to obtain individual amplitude samples. The amplitude modulation signal can also be delayed due to delays from locations along an amplitude modulation path. It is noted that alternate methods and systems of the invention contemplate utilizing signals other than amplitude modulation signals from the amplitude modulation path. For example, a constant envelope modulation scheme omits the amplitude modulation path and utilizes power up and down ramping by regulating the supply voltage.

One or more factors are calculated or determined from the amplitude modulation signal at block 904. The factors can include those from the above equations. In one example, the factors include a current amplitude sample squared and the current amplitude sample cubed.

The factors are monitored to identify maximum values at block 906. The maximum values are then stored in a storage component, such as a flip-flop. In one example, the maximum values represent maximum amplitude samples squared and cubed for a current frame.

A start of a peak sequence is identified at block 908. Examples of a peak portion or sequence are shown in FIGS. 5A and 5B, above. The peak sequence is identified by monitoring the amplitude signal.

A peak compensation signal is generated during the identified peak sequence at block 910. The peak compensation signal can be combined with characterization coefficients and/or other distortion estimates in order to generate a correction signal during the peak sequence. The correction signal can be utilized to pre-distort a phase modulation signal along a phase modulation path of a polar modulator.

During non-peak portions or sequences, the factors can be combined with the characterization coefficients and/or other distortion estimates to generate the correction signal. The characterization coefficients are generated according to one or more inputs, including frequency deviation samples or signal. Examples of generating the characterization coefficients are shown above.

While the above method 900 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A communication system comprising:
   a frequency deviation component configured to generate a frequency deviation signal;
   a characterization component configured to generate characterization coefficients according to a first signal and the frequency deviation signal;
   a peak cancellation component configured to identify peaks according to the first signal and generate a peak cancellation signal to compensate for peak distortion by the identified peaks; and
   a compensation unit configured to utilize the characterization coefficients, the first signal and the peak cancellation signal to generate a correction signal that compensates for the peak distortions and amplitude modulation to frequency modulation effects.

2. The system of claim 1, further comprising a summation component configured to receive the phase modulation signal and the correction signal and to generate a corrected modulation signal there from.

3. The system of claim 2, further comprising a digital phase locked loop circuit comprising a digital controlled oscillator and configured to generate a carrier phase modulation signal from the corrected modulation signal.

4. The system of claim 3, wherein the digital phase locked loop circuit is further configured to provide a divided signal to the frequency deviation component.

5. The system of claim 1, wherein the frequency deviation signal represents an instantaneous frequency deviation of the phase modulation signal.

6. The system of claim 1, wherein the first signal is an amplitude modulation signal and wherein the peak cancellation component is configured to monitor the amplitude modulation signal to identify frequency peaks.

7. The system of claim 6, wherein the peak cancellation component is configured to determine a maximum amplitude value.

8. The system of claim 7, wherein the peak cancellation component is configured to generate polynomial factors having selected orders from the maximum amplitude value.

9. The system of claim 8, wherein the compensation unit is configured to utilize the polynomial factors with the characterization coefficients to generate the correction signal.

10. The system of claim 9, wherein the amplitude modulation signal and the phase modulation signal are of a communication sequence having a first portion and a second portion, wherein the characterization component is configured to develop the characterization coefficients during a first portion of a communication sequence and the compensation unit utilizes the characterization coefficients during a second portion of the communication sequence to generate the correction signal.

11. A compensation system comprising:
    a coefficient generator configured to generate a plurality of coefficients according to a frequency deviation signal;
    factor units configured to generate a plurality of factors according to a first signal;
    peak cancellation storage components configured to identify peaks and determine maximum amplitude values from the first signal and to provide the maximum amplitude values as outputs only during the identified peaks;
    peak cancellation summation components configured to add the outputs of the peak cancellation storage components to the plurality of factors to generate peak compensated factors;

mixers configured to multiply the peak compensated factors with the plurality of coefficients to generate mixed factors; and a summation component configured to add the mixed factors to generate a correction signal.

12. The system of claim 11, wherein the plurality of coefficients comprise a second order coefficient and a third order coefficient.

13. The system of claim 11, wherein the coefficient generator is configured to utilize a least squares estimate to generate the plurality of coefficients.

14. The system of claim 11, wherein plurality of factors include a second order factor and a third order factor.

15. The system of claim 11, wherein the maximum amplitude values include squared and cubed maximum amplitude values.

16. The system of claim 11, further comprising a summation component to pre-distort a phase modulation signal with the correction signal and generate a corrected phase modulation signal.

17. A method of compensating for peak distortions, the method comprising:
   determining one or more factors from a first signal;
   storing a portion of the one or more factors as maximum factor values;
   identifying a start of a peak sequence from the first signal; and
   generating a peak compensation signal during the peak sequence according to the one or more factors and the maximum factor values;
   using the peak compensation signal as an intermediate correction signal during the peak sequence; and
   generating one or more characterization coefficients from a frequency deviation signal and generating a correction signal from the intermediate correction signal and the characterization coefficients.

18. The method of claim 17, wherein the intermediate correction signal is generated according to the one or more factors.

* * * * *